United States Patent
Wang (10) Patent No.: US 11,151,872 B2
(45) Date of Patent: Oct. 19, 2021

(54) TRANSMITTING TRAFFIC INFORMATION VIA OPTICAL SIGNALS

(71) Applicant: Intel Corporation, Santa Clara, CA (US)

(72) Inventor: Fan Wang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/650,771

(22) PCT Filed: Dec. 29, 2017

(86) PCT No.: PCT/CN2017/119882
§ 371 (c)(1),
(2) Date: Mar. 25, 2020

(87) PCT Pub. No.: WO2019/127380
PCT Pub. Date: Jul. 4, 2019

(65) Prior Publication Data
US 2021/0134153 A1    May 6, 2021

(51) Int. Cl.
G08G 1/0967    (2006.01)
G08G 1/01      (2006.01)
H04B 10/112    (2013.01)

(52) U.S. Cl.
CPC ..... *G08G 1/096725* (2013.01); *G08G 1/0112* (2013.01); *G08G 1/0129* (2013.01); *G08G 1/0141* (2013.01); *G08G 1/096741* (2013.01); *H04B 10/1123* (2013.01); *H04B 10/1129* (2013.01)

(58) Field of Classification Search
CPC .......... G08G 1/096725; G08G 1/0112; G08G 1/0129; G08G 1/0141; G08G 1/096741; H04B 10/1123; H04B 10/1129
USPC ........................................................ 340/907
See application file for complete search history.

(56) References Cited

U.S. PATENT DOCUMENTS

| 4,921,468 A * | 5/1990 | Miwa ................. H04B 10/1141 340/905 |
| 2005/0137782 A1* | 6/2005 | Shinada ............... G08G 1/0965 701/117 |
| 2005/0187701 A1* | 8/2005 | Baney ............. G08G 1/096716 701/117 |

(Continued)

FOREIGN PATENT DOCUMENTS

| CN | 103914979 A | 7/2014 |
| CN | 104751669 A | 7/2015 |

(Continued)

OTHER PUBLICATIONS

Notification of Transmittal of the International Search Report and the Written Opinion of the International Searching Authority, or the Declaration for PCT Application No. PCT/CN2017/119882, dated Sep. 25, 2018, 9 pages.

*Primary Examiner* — Emily C Terrell
(74) *Attorney, Agent, or Firm* — Schiff Hardin LLP (57) ABSTRACT

A controller comprises processing circuitry to collect traffic information in a geographic region and generate traffic statistics for the region using the traffic information and a communication interface to forward the traffic statistics to an optical transmitter assembly. Other examples may be described and claimed.

23 Claims, 11 Drawing Sheets

(56) References Cited

U.S. PATENT DOCUMENTS

| | | | | |
|---|---|---|---|---|
| 2005/0270175 A1* | 12/2005 | Peddie | ............... | E01F 9/559 |
| | | | | 340/907 |
| 2006/0267795 A1* | 11/2006 | Draaijer | ............... | G08G 1/04 |
| | | | | 340/907 |
| 2010/0019937 A1* | 1/2010 | Mori | ............... | G08G 1/095 |
| | | | | 340/936 |
| 2011/0035140 A1* | 2/2011 | Candy | ............... | G08G 1/052 |
| | | | | 701/119 |
| 2018/0372504 A1* | 12/2018 | Singhal | ............ | G01C 21/3492 |

FOREIGN PATENT DOCUMENTS

| | | |
|---|---|---|
| CN | 205665530 U | 10/2016 |
| CN | 106384506 A | 2/2017 |
| CN | 107483117 A | 12/2017 |
| JP | 2013125538 A | 6/2013 |

\* cited by examiner

FIG. 10 dance with some examples. Referring to FIG. 1, in some
TRANSMITTING TRAFFIC INFORMATION VIA OPTICAL SIGNALS

RELATED APPLICATIONS

This application claims the benefit of priority under 35 U.S.C. § 371 to International Application No. PCT/CN2017/119882 filed Dec. 29, 2017, entitled TRANSMITTING TRAFFIC INFORMATION VIA OPTICAL SIGNALS. The entire contents of which are hereby incorporated by reference herein.

BACKGROUND

The subject matter described herein relates generally to the field of electronic devices and more particularly to systems and methods for transmitting traffic information via optical signals.

The automotive industry is rapidly evolving, but there is still much to accomplish to instill driver trust before vehicle control systems are able to take control of vehicles. Some new traffic information technologies, e.g., High-Precision Mapping, also referred to as High Detail (HD) Mapping were developed or planned to support highly automated driving use cases. A High-Precision Map is an advanced mapping asset which enables a vehicle control system to see more details of an environment in order to make right decisions. These "details" include static traffic objects, such as slope, curvature, lane marking types etc., and dynamic events such as pedestrians, traffic conditions and hazard warnings.

Including more environmental details in the maps will generate more traffic data which must be transmitted from traffic/vehicle control systems to vehicles in an effective and reliable way. Many existing solutions are based on radio waves, which have some limitations such as low rate, high latency, and sensitive to noise and interference.

In addition, autonomous vehicles demand stringent location techniques. The location accuracy for a moving vehicle via GPS can deviate by several meters. This is acceptable for human control vehicles, but is insufficiently accurate for autonomous driving vehicles Accordingly, systems and methods to transmit traffic information via optical signals may find utility, e.g., in high precision mapping for autonomous vehicles.

BRIEF DESCRIPTION OF THE DRAWINGS

The detailed description is described with reference to the accompanying figures.

DETAILED DESCRIPTION

Described herein are examples of transmitting traffic information via optical signals which, in some examples, may be used for autonomous vehicles. In the following description, numerous specific details are set forth to provide a thorough understanding of various examples. However, it will be understood by those skilled in the art that the various examples may be practiced without the specific details. In other instances, well-known methods, procedures, components, and circuits have not been illustrated or described in detail so as not to obscure the particular examples.

Described herein are techniques to transmitting traffic information via optical signals. In some examples a traffic information in a particular geographic region may be collected from various sensors and/or monitoring devices by a traffic management system. The traffic management system may process the traffic information to generate various traffic statistics for the geographic region and forward the traffic statistics to one or more optical transmitter assemblies, which transmit the traffic statistics via an optical interface. A vehicle control system in a vehicle receives the optical signals and implements or modifies driving instructions based on the statistics. In some examples the traffic management system may forward vehicle specific control information to a vehicle via the optical transmitter assemblies.

As used herein, the phrase optical signal or optical signals should be construed broadly to include signals transmitted using electromagnetic radiation which obeys the laws of optics, i.e., that can be focused and/or refracted by lenses. Those wavelengths generally include ultraviolet (UV) radiation, visible light, and infrared (IR) radiation. The optical spectrum exists in the range between about 100 nanometers (nm) to 1 millimeter (mm).

Subject matter described herein may be used advantageously with autonomous, or semi-autonomous, vehicles. As used herein, the phrase autonomous vehicle refers to a vehicle which is capable of operating without human direction. By contrast, the phrase semi-autonomous vehicle refers to a vehicle which relies upon human direction for at least some of the vehicle operations, but may supplement human direction with various machine-assisted operations. As used herein, the term vehicle should be construed broadly to include cars, trucks, ships, aircrafts, spacecrafts, trains, buses or any form of transportation. Further structural and operational details will be described with reference to FIGS. 1-10, below.

Figure 1:
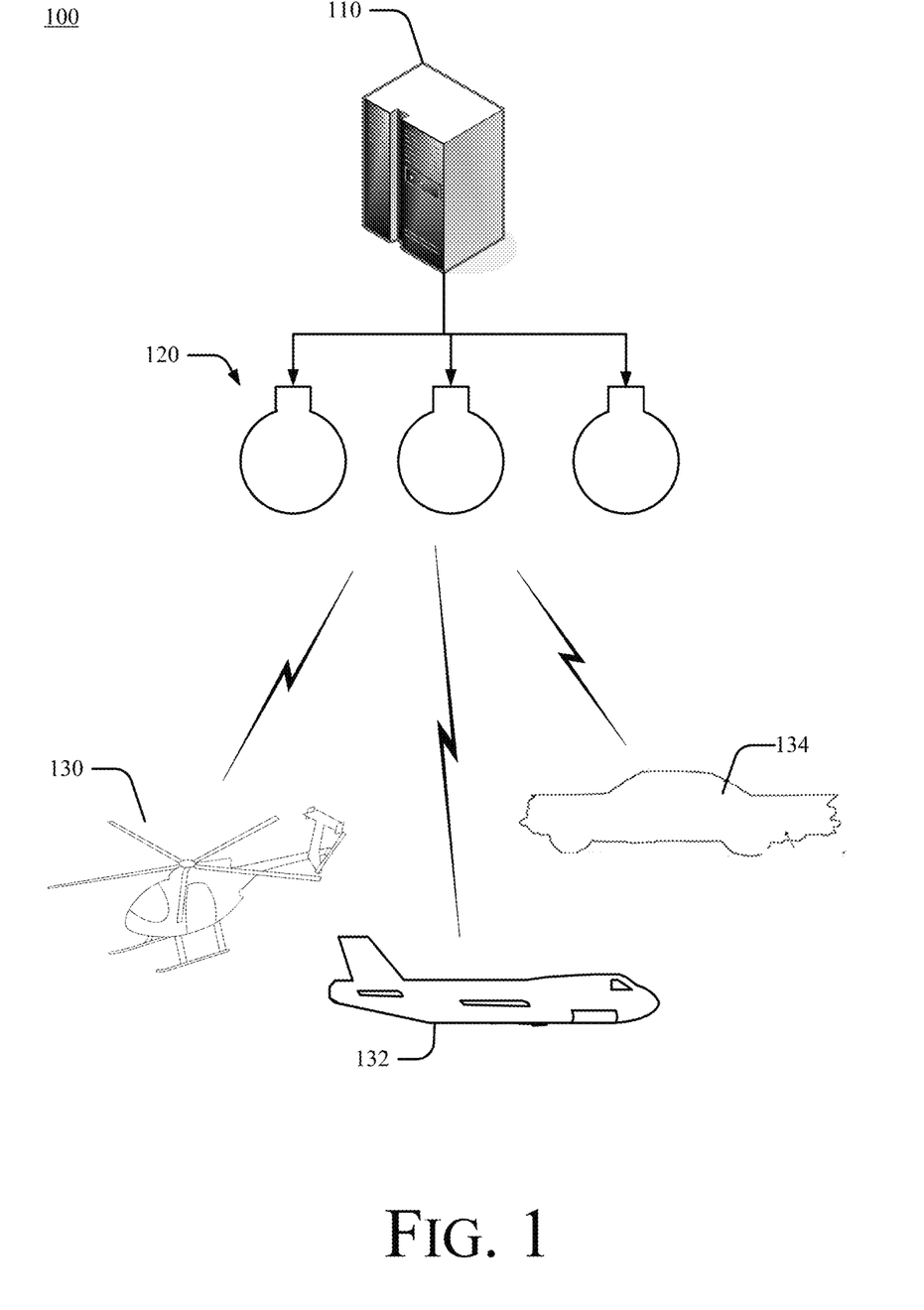
FIG. 1 is a schematic illustration of an environment to implement transmitting traffic information via optical signals, in accordance with some examples.

FIG. 1 is a schematic illustration of an environment for transmitting traffic information via optical signals, in accordance with some examples. Referring to FIG. 1, in some examples the environment 100 comprises one or more cloud-based traffic management systems 110 communicatively coupled to one or more optical transmitter assemblies 120 capable of transmitting information from the vehicle management system(s) 110 to one or more autonomous vehicles such as a helicopter 130, an aircraft 132 or an automotive vehicle 134.

In some examples traffic management system(s) 110 may comprise one or more processor-based devices, e.g., server(s) comprising computer-readable memory which stores software updates for one or more devices communicatively coupled to the one or more autonomous vehicles.

Figure 2:
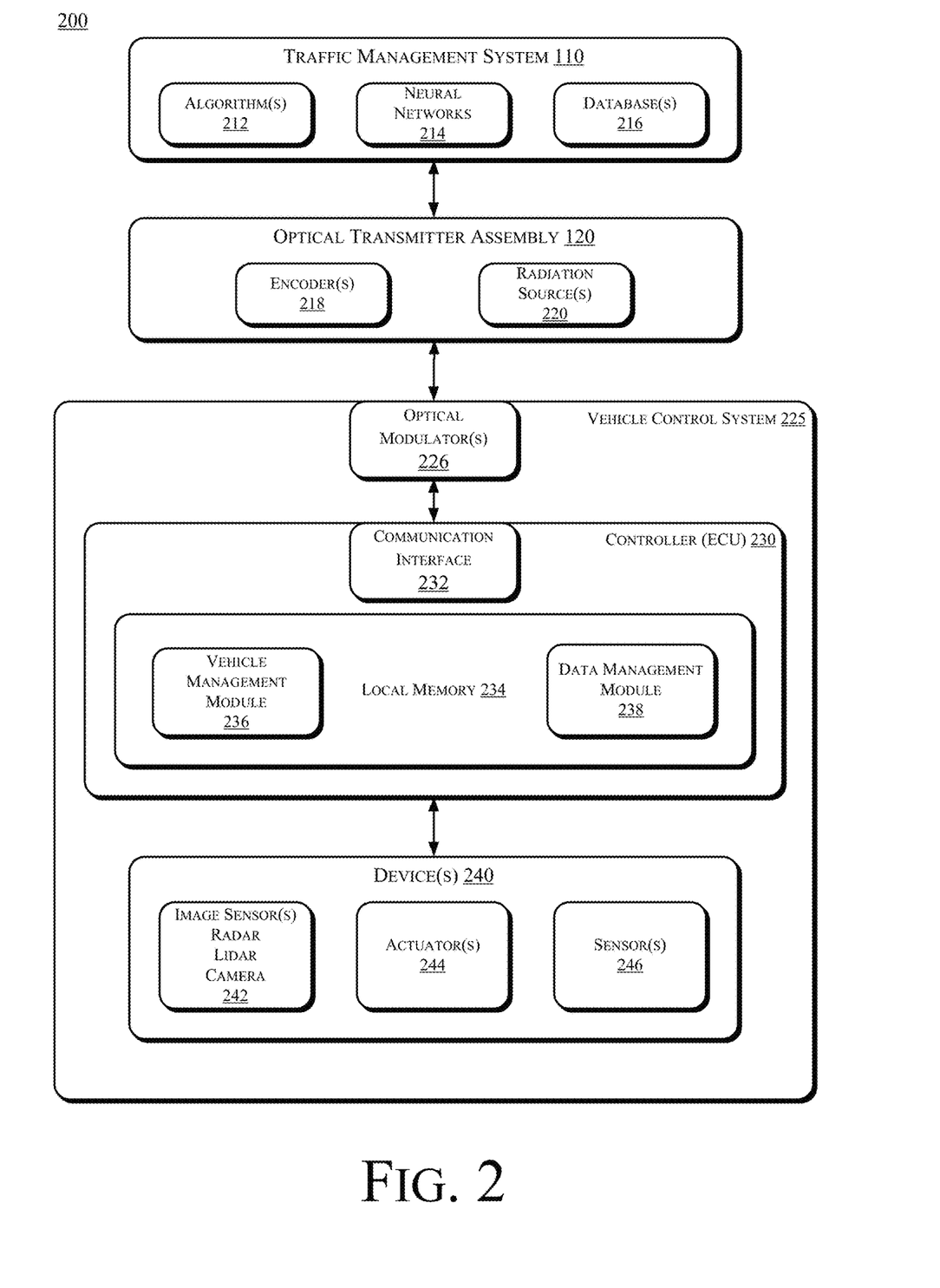
FIG. 2 is a high-level schematic illustration of an exemplary architecture to implement transmitting traffic information via optical signals in accordance with some examples.

FIG. 2 is a high-level schematic illustration of an exemplary architecture to transmit traffic information via optical signals in accordance with some examples. Referring to FIG. 2, in some examples the traffic management system 110 may comprise one or more vehicle management algorithms 212 which may comprise software and/or firmware to manage devices on one or more vehicles. Traffic management system 110 may comprise one or more neural networks 214 to manage devices on one or more autonomous vehicles. Traffic management system 110 may further comprise one or more databases 216 to manage data associated with traffic conditions and/or devices on one or more vehicles.

Traffic management system 110 is communicatively coupled to one or more optical transmitter assemblies 120, e.g., via a suitable communication link or communication network. In some examples the one or more optical transmitter assemblies 120 comprise an encoder 218 to encode the data received from the traffic management system 120 into electrical signals and one or more radiation sources 220 to generate optical signals for transmission.

A vehicle control system 225 may comprise one or more optical modulator(s) 226 to receive optical signals and to convert the optical signals to an electrical signal which is directed to a controller 230, also referred to sometimes as an electronic control unit (ECU). Controller 230 may be incorporated into or communicatively coupled to an autonomous vehicle. Controller 230 may be embodied as general purpose processor such as an Intel® Core2 Duo® processor available from Intel Corporation, Santa Clara, Calif., USA. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit. Alternatively, controller 230 may be embodied as a low-power controller such as a field programmable gate array (FPGA) or the like.

Controller 230 may comprise a communication interface 232 to manage communication with optical modulator(s) 226. In some examples communication interface 232 may comprise, or be coupled to, an RF transceiver which may implement a local wireless connection via a protocol such as, e.g., Bluetooth or 802.11X. IEEE 802.11a, b or g-compliant interface (see, e.g., IEEE Standard for IT-Telecommunications and information exchange between systems LAN/MAN-Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

In some examples, local memory module 234 may comprise random access memory (RAM) and/or read-only memory (ROM). Memory 236 may be also be implemented using other memory types such as dynamic RAM (DRAM), synchronous DRAM (SDRAM), and the like. Memory 234 may comprise one or more applications including a vehicle management module 236 and a data management module 238, which may be implemented as logic instructions executable on controller 230, e.g., as software or firmware, or may be reduced to hardwired logic circuits.

Controller 230 may be coupled to one or more devices 240 on an autonomous vehicle. For example, devices 240 may include one or more image sensor(s) (e.g., radar(s), lidar(s), camera(s)) 242, actuator(s)s 244, or other sensor(s) 246.

Figure 3:
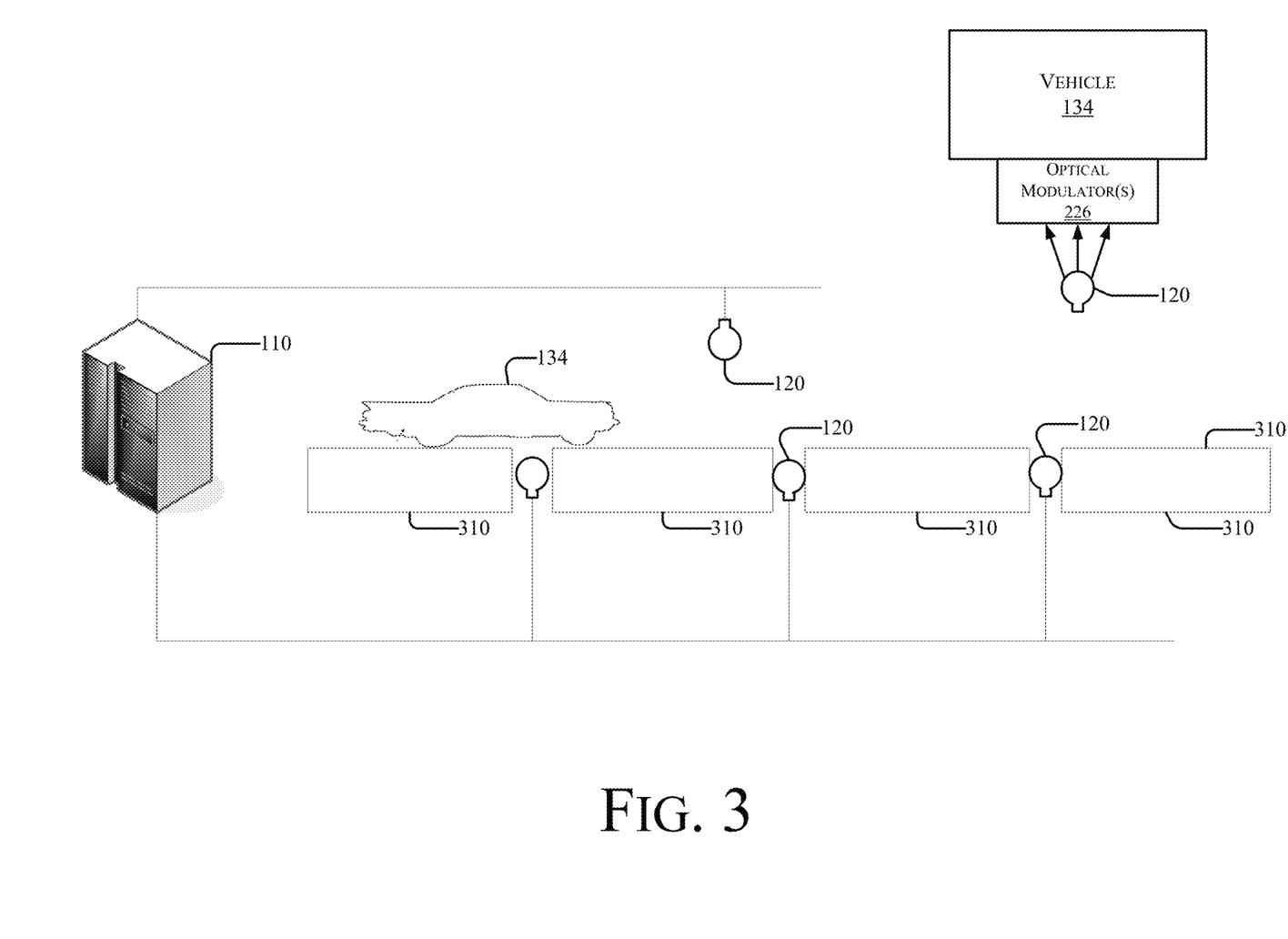
FIG. 3 is a diagram illustrating elements in an architecture to implement transmitting traffic information via optical signals in accordance with some examples.

Referring to FIG. 3, in one example the traffic management system 110 may be coupled to a one or more optical transmitter assemblies 120 that are embedded in a roadway 310. Alternatively, or in addition, the traffic management system 110 may be coupled to a one or more optical transmitter assemblies 120 that are positioned above a roadway 310, e.g., suspended from signage or other structures. In either case optical signals from the optical transmitter assemblies 120 impinge upon the optical modulator(s) 226 coupled to the vehicle 134.

Figure 4:
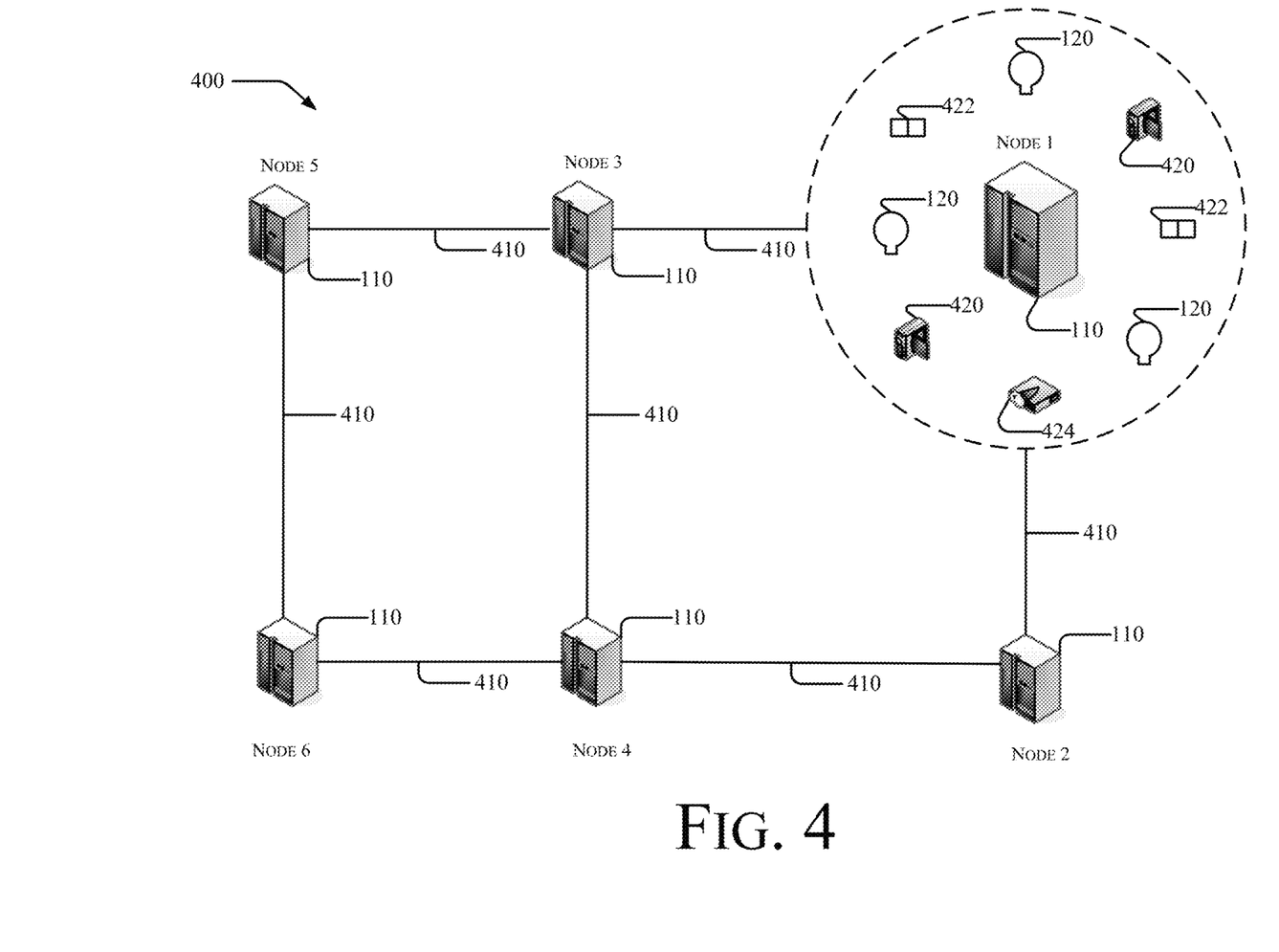
FIG. 4 is a diagram illustrating elements in an architecture to implement transmitting traffic information via optical signals in accordance with some examples.

Referring to FIG. 4, in one example a plurality of traffic management systems 110 may be connected by suitable communication links 410 to form a grid which covers an expanded geographic area. In the example depicted in FIG. 4 each traffic management system 110 may be considered a node in traffic management network 400. Each traffic management system may be couple to input/output device including, but not limited to, optical transmitter assemblies 120, cameras 420, inductive coils 422, and radar(s) 424.

Figure 5A:
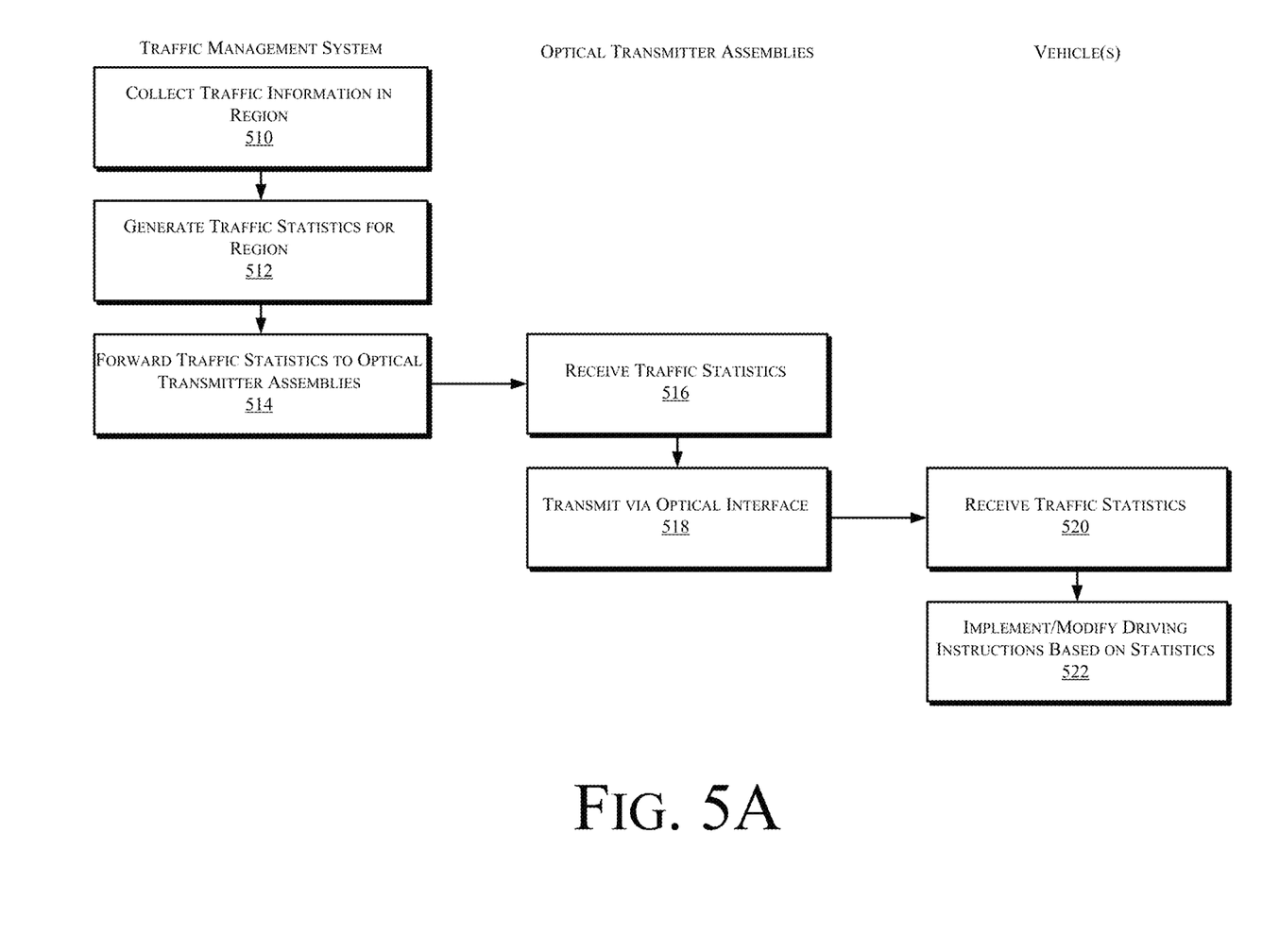
FIGS. 5A-5B are flowcharts illustrating operations in a method to implement transmitting traffic information via optical signals in accordance with some examples.

Having described various structural components of examples of an architecture to transmit traffic information via optical signals, operations implemented by the system will be described with reference to FIGS. 5A-5B. Referring to FIG. 5A, in a first example at operation 510 a traffic management system 110 collects traffic information in a particular region. For example, a traffic management system 110 may collect traffic information from one or more of the input/output devices described with reference to FIG. 4.

At operation 512 the traffic management system 110 may process the traffic information collected in operation 510 to generate traffic statistics for the region. Examples of traffic statistics may include traffic density on particular streets or roadways, travel times between locations, obstacles or accidents, law enforcement actions, or the like. At operation 514 the traffic statistics generated in operation 512 are forwarded to the optical transmitter assemblies 120 communicatively coupled to the traffic management system 110.

At operation 516 the optical transmitter assemblies 120 receive the traffic statistics from the traffic management system 110 and at operation 518 the optical transmitter assemblies transmit the traffic statistics via an optical interface. Thus, in some examples the traffic statistics are effectively broadcast via the optical transmitter assemblies 120 coupled to the traffic management system 110.

At operation 520 the traffic statistics transmitted via an optical interface are received by the optical modulators 226 of one or more vehicles 134. The optical modulators 226 decode the optical signals into electrical signals, which are passed to the communication interface 232 of the controller 230. In response to the traffic statistics the vehicle management module 236 may implement and/or modify driving instructions for the vehicle 134. Alternatively, or in addition, the data management module 238 may update traffic statistics data stored in the local memory 234 of the controller 230.

In another example vehicle-specific control information may be generated and transmitted to a vehicle via the optical interface(s). Referring to FIG. 5B, at operation 530 a traffic management system 110 may generate vehicle specific control information for a target vehicle. By way of example, traffic management system 110 may generate instructions for an autonomous vehicle 134 to implement a particular driving instruction, e.g., speed up, slow down, change routes, etc.

At operation 532 the traffic management system 110 locates the target vehicle and determines the next optical transmitter assemblies in the target vehicle's path. By way of example, referring to FIG. 3 the traffic management system may determine the location of the target vehicle 134 on the roadway 310 and may determine which optical transmitter assemblies 120 are in the path of the vehicle 134. In some examples the traffic management system 110 may also calculate an estimated time of arrival (ETA) of the vehicle at the next optical transmitter assembly. At operation 534 the vehicle specific control information generated in operation 532 are forwarded to the optical transmitter assemblies 120 communicatively coupled to the traffic management system 110.

At operation 536 the optical transmitter assemblies 120 receive the vehicle specific control information from the traffic management system 110 and at operation 518 the optical transmitter assemblies transmit the vehicle specific control information via an optical interface. In some examples the optical transmitter assemblies 120 wait for a period of time corresponding approximately to the estimated time of arrival of the vehicle 134 at the next optical transmitter assembly 120 in it's travel path. The vehicle specific control information may be transmitted repeatedly by the optical transmitter assemblies for a time window surrounding the estimated time of arrival of the vehicle 134 at next optical transmitter assembly 120 in it's travel path.

At operation 536 the vehicle specific control information transmitted via an optical interface is received by the optical modulators 226 of the target vehicle 134. The optical modulators 226 decode the optical signals into electrical signals, which are passed to the communication interface 232 of the controller 230. In response to the vehicle specific control information the vehicle management module 236 may implement and/or modify driving instructions for the vehicle 134. Alternatively, or in addition, the data management module 238 may update vehicle management data stored in the local memory 234 of the controller 230.

At operation 544 it is determined whether the target vehicle 134 has changed course, e.g., due to a driving instruction to change course or due to human intervention. If, at operation 544, the vehicle has changed course then control passes back to operation 532 and the traffic management system 110 locates the target vehicle and determines the next optical transmitter assemblies in the target vehicle's new path. Operations 534-542 may then be repeated with the new course information for the target vehicle. By contrast, if at operation 544 there is no change in course for the vehicle then control passes to operation 546 and the routine ends for this control information update.

Figure 5B:
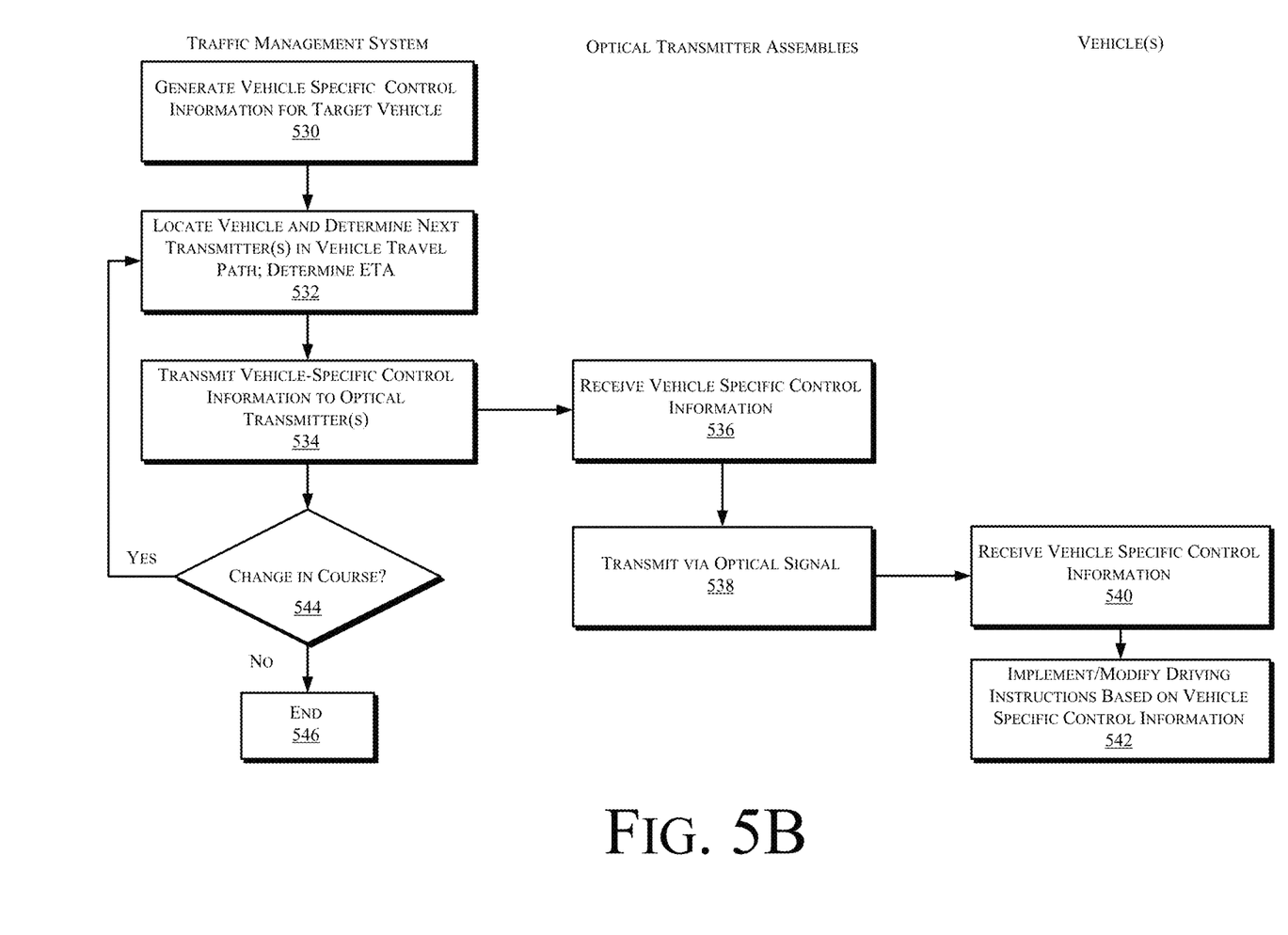

Thus, the operations depicted in FIG. 5B enable the traffic management system 110 to direct vehicle specific control information to target vehicles via optical interfaces. The operations depicted in FIG. 5B may be perform independently or in conjunction with the operations depicted in FIG. 5A.

Figure 6:
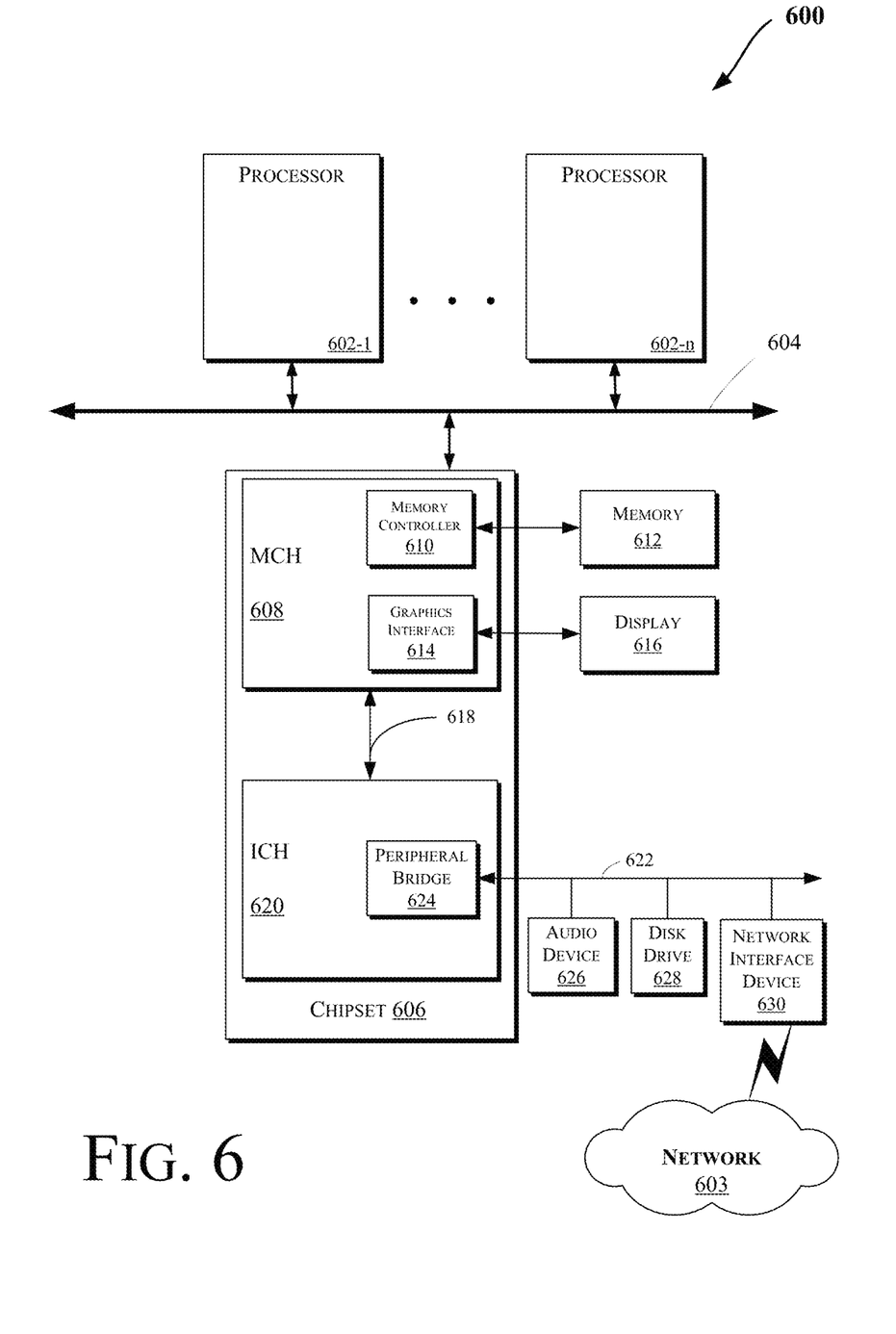
FIGS. 6-10 are schematic illustrations of electronic devices which may be adapted for use in transmitting traffic information via optical signals in accordance with some examples.

Thus, described herein are examples of transmitting traffic information via optical signals. As described above, in some examples the traffic management system 110 and/or the controller 230 may be embodied as a computer system. FIG. 6 illustrates a block diagram of a computing system 600 in accordance with an example. The computing system 600 may include one or more central processing unit(s) 602 or processors that communicate via an interconnection network (or bus) 604. The processors 602 may include a general purpose processor, a network processor (that processes data communicated over a computer network 603), or other types of a processor (including a reduced instruction set computer (RISC) processor or a complex instruction set computer (CISC)). Moreover, the processors 602 may have a single or multiple core design. The processors 602 with a multiple core design may integrate different types of processor cores on the same integrated circuit (IC) die. Also, the processors 602 with a multiple core design may be implemented as symmetrical or asymmetrical multiprocessors.

A chipset 606 may also communicate with the interconnection network 604. The chipset 606 may include a memory control hub (MCH) 608. The MCH 608 may include a memory controller 610 that communicates with a memory 612. The memory 412 may store data, including sequences of instructions, that may be executed by the processor 602, or any other device included in the computing system 600. In one example, the memory 612 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 604, such as multiple processor(s) and/or multiple system memories.

The MCH 608 may also include a graphics interface 614 that communicates with a display device 616. In one example, the graphics interface 614 may communicate with the display device 616 via an accelerated graphics port (AGP). In an example, the display 616 (such as a flat panel display) may communicate with the graphics interface 614 through, for example, a signal converter that translates a digital representation of an image stored in a storage device such as video memory or system memory into display signals that are interpreted and displayed by the display 616. The display signals produced by the display device may pass through various control devices before being interpreted by and subsequently displayed on the display 616.

A hub interface 618 may allow the MCH 608 and an input/output control hub (ICH) 620 to communicate. The ICH 620 may provide an interface to I/O device(s) that communicate with the computing system 600. The ICH 620 may communicate with a bus 622 through a peripheral bridge (or controller) 624, such as a peripheral component interconnect (PCI) bridge, a universal serial bus (USB) controller, or other types of peripheral bridges or controllers. The bridge 624 may provide a data path between the processor 602 and peripheral devices. Other types of topologies may be utilized. Also, multiple buses may communicate with the ICH 620, e.g., through multiple bridges or controllers. Moreover, other peripherals in communication with the ICH 620 may include, in various examples, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 622 may communicate with an audio device 626, one or more disk drive(s) 628, and a network interface device 630 (which is in communication with the computer network 603). Other devices may communicate via the bus 622. Also, various components (such as the network interface device 630) may communicate with the MCH 608 in some examples. In addition, the processor 602 and one or more other components discussed herein may be combined to form a single chip (e.g., to provide a System on Chip (SOC)). Furthermore, the graphics accelerator 616 may be included within the MCH 608 in other examples.

Furthermore, the computing system 600 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 628), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 7:
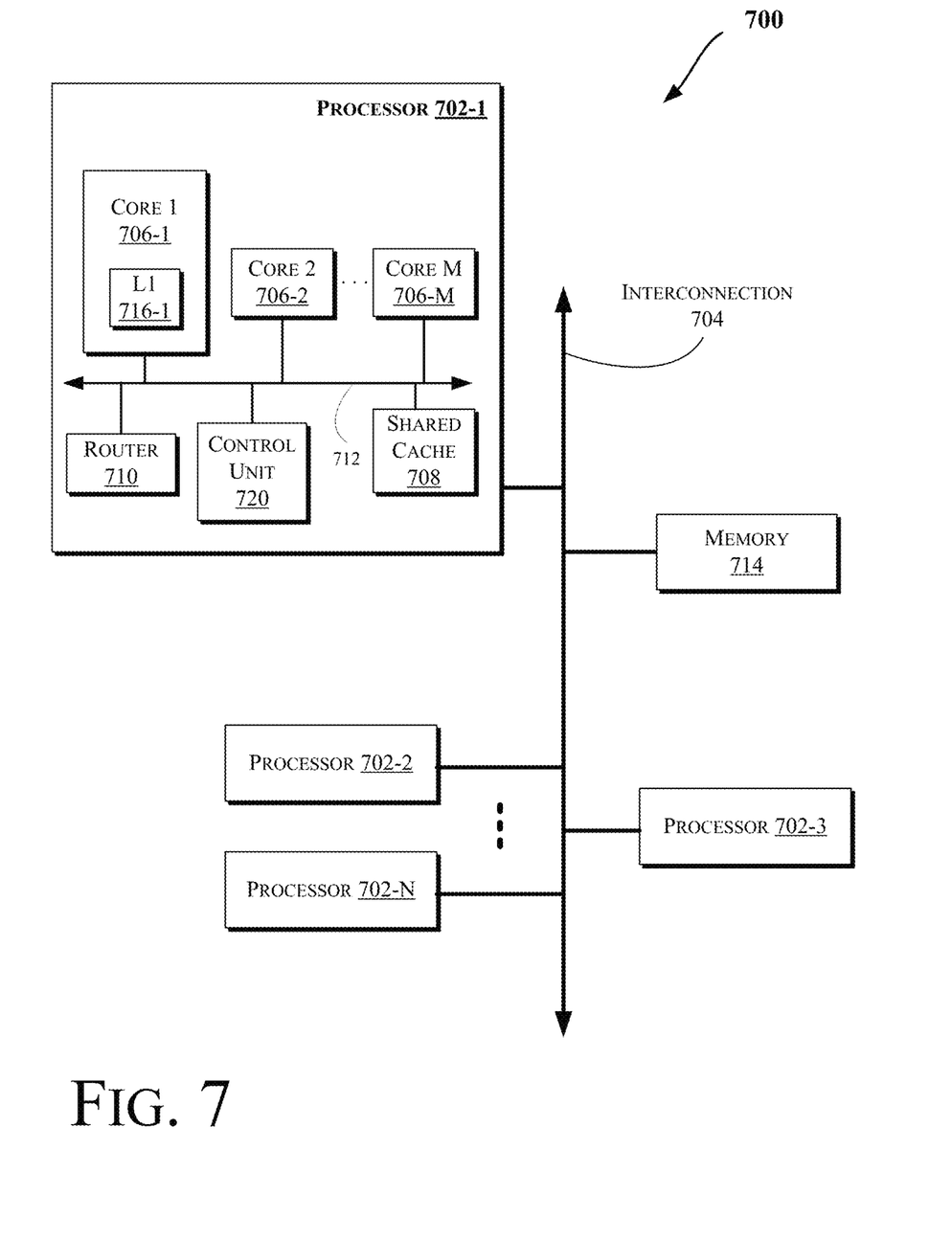

FIG. 7 illustrates a block diagram of a computing system 700, according to an example. The system 700 may include one or more processors 702-1 through 702-N (generally referred to herein as "processors 702" or "processor 702"). The processors 702 may communicate via an interconnection network or bus 704. Each processor may include various components some of which are only discussed with reference to processor 702-1 for clarity. Accordingly, each of the remaining processors 702-2 through 702-N may include the same or similar components discussed with reference to the processor 702-1.

In an example, the processor 702-1 may include one or more processor cores 706-1 through 706-M (referred to herein as "cores 706" or more generally as "core 706"), a shared cache 708, a router 710, and/or a processor control logic or unit 720. The processor cores 706 may be implemented on a single integrated circuit (IC) chip. Moreover, the chip may include one or more shared and/or private caches (such as cache 708), buses or interconnections (such as a bus or interconnection network 712), memory controllers, or other components.

In one example, the router 710 may be used to communicate between various components of the processor 702-1 and/or system 700. Moreover, the processor 702-1 may include more than one router 710. Furthermore, the multitude of routers 710 may be in communication to enable data routing between various components inside or outside of the processor 702-1.

The shared cache 708 may store data (e.g., including instructions) that are utilized by one or more components of the processor 702-1, such as the cores 706. For example, the shared cache 708 may locally cache data stored in a memory 714 for faster access by components of the processor 702. In an example, the cache 708 may include a mid-level cache (such as a level 2 (L2), a level 3 (L3), a level 4 (L4), or other levels of cache), a last level cache (LLC), and/or combinations thereof. Moreover, various components of the processor 702-1 may communicate with the shared cache 708 directly, through a bus (e.g., the bus 712), and/or a memory controller or hub. As shown in FIG. 7, in some examples, one or more of the cores 706 may include a level 1 (L1) cache 716-1 (generally referred to herein as "L1 cache 716").

Figure 8:
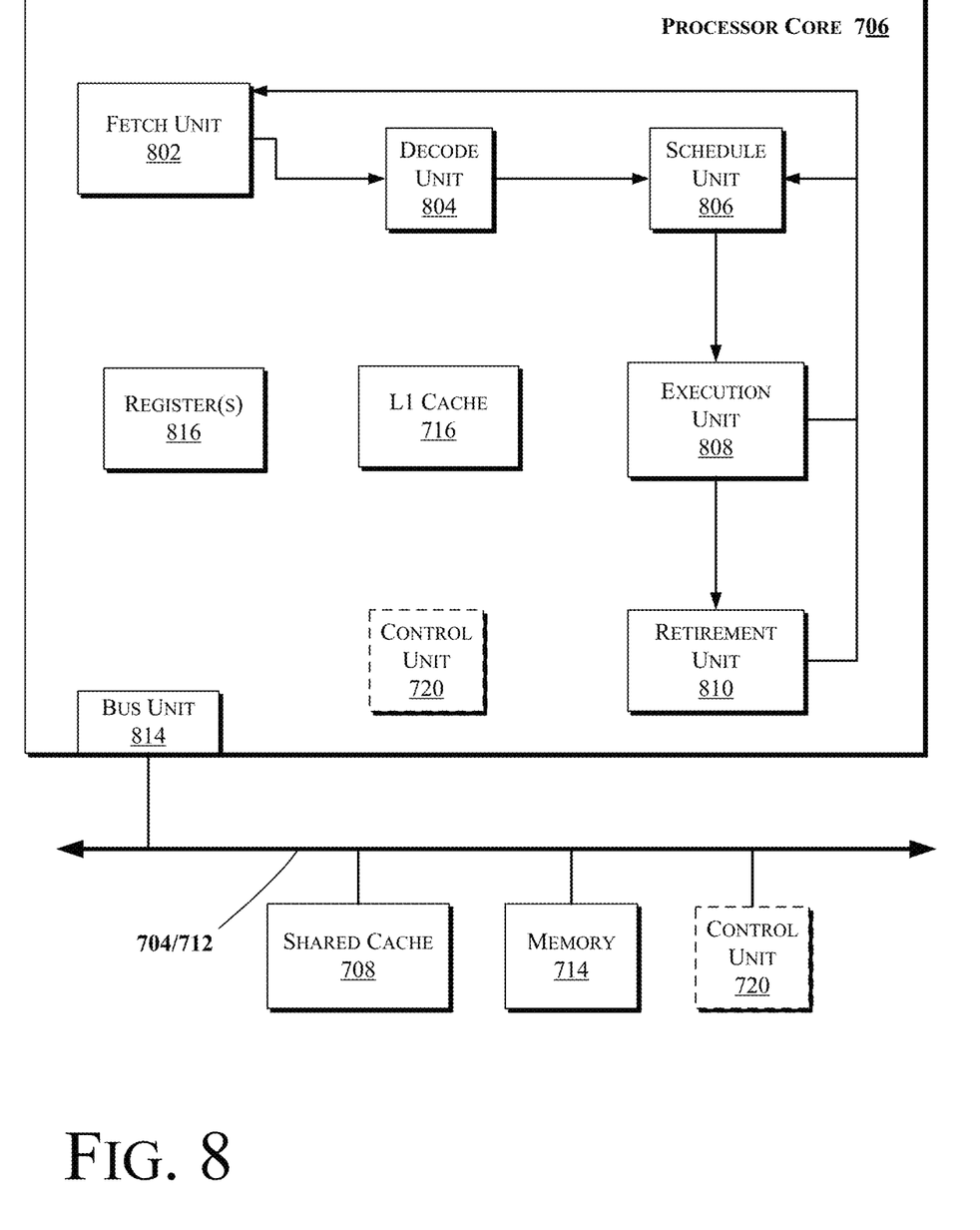

FIG. 8 illustrates a block diagram of portions of a processor core 706 and other components of a computing system, according to an example. In one example, the arrows shown in FIG. 8 illustrate the flow direction of instructions through the core 706. One or more processor cores (such as the processor core 706) may be implemented on a single integrated circuit chip (or die) such as discussed with reference to FIG. 7. Moreover, the chip may include one or more shared and/or private caches (e.g., cache 708 of FIG. 7), interconnections (e.g., interconnections 704 and/or 112 of FIG. 7), control units, memory controllers, or other components.

As illustrated in FIG. 8, the processor core 706 may include a fetch unit 802 to fetch instructions (including instructions with conditional branches) for execution by the core 706. The instructions may be fetched from any storage devices such as the memory 714. The core 706 may also include a decode unit 804 to decode the fetched instruction. For instance, the decode unit 804 may decode the fetched instruction into a plurality of uops (micro-operations).

Additionally, the core 706 may include a schedule unit 806. The schedule unit 806 may perform various operations associated with storing decoded instructions (e.g., received from the decode unit 804) until the instructions are ready for dispatch, e.g., until all source values of a decoded instruction become available. In one example, the schedule unit 806 may schedule and/or issue (or dispatch) decoded instructions to an execution unit 808 for execution. The execution unit 808 may execute the dispatched instructions after they are decoded (e.g., by the decode unit 804) and dispatched (e.g., by the schedule unit 806). In an example, the execution unit 808 may include more than one execution unit. The execution unit 808 may also perform various arithmetic operations such as addition, subtraction, multiplication, and/or division, and may include one or more an arithmetic logic units (ALUs). In an example, a co-processor (not shown) may perform various arithmetic operations in conjunction with the execution unit 808.

Further, the execution unit 808 may execute instructions out-of-order. Hence, the processor core 706 may be an out-of-order processor core in one example. The core 706 may also include a retirement unit 810. The retirement unit 810 may retire executed instructions after they are committed. In an example, retirement of the executed instructions may result in processor state being committed from the execution of the instructions, physical registers used by the instructions being de-allocated, etc.

The core 706 may also include a bus unit 714 to enable communication between components of the processor core 706 and other components (such as the components discussed with reference to FIG. 8) via one or more buses (e.g., buses 804 and/or 812). The core 706 may also include one or more registers 816 to store data accessed by various components of the core 706 (such as values related to power consumption state settings).

Furthermore, even though FIG. 7 illustrates the control unit 720 to be coupled to the core 706 via interconnect 812, in various examples the control unit 720 may be located elsewhere such as inside the core 706, coupled to the core via bus 704, etc.

Figure 9:
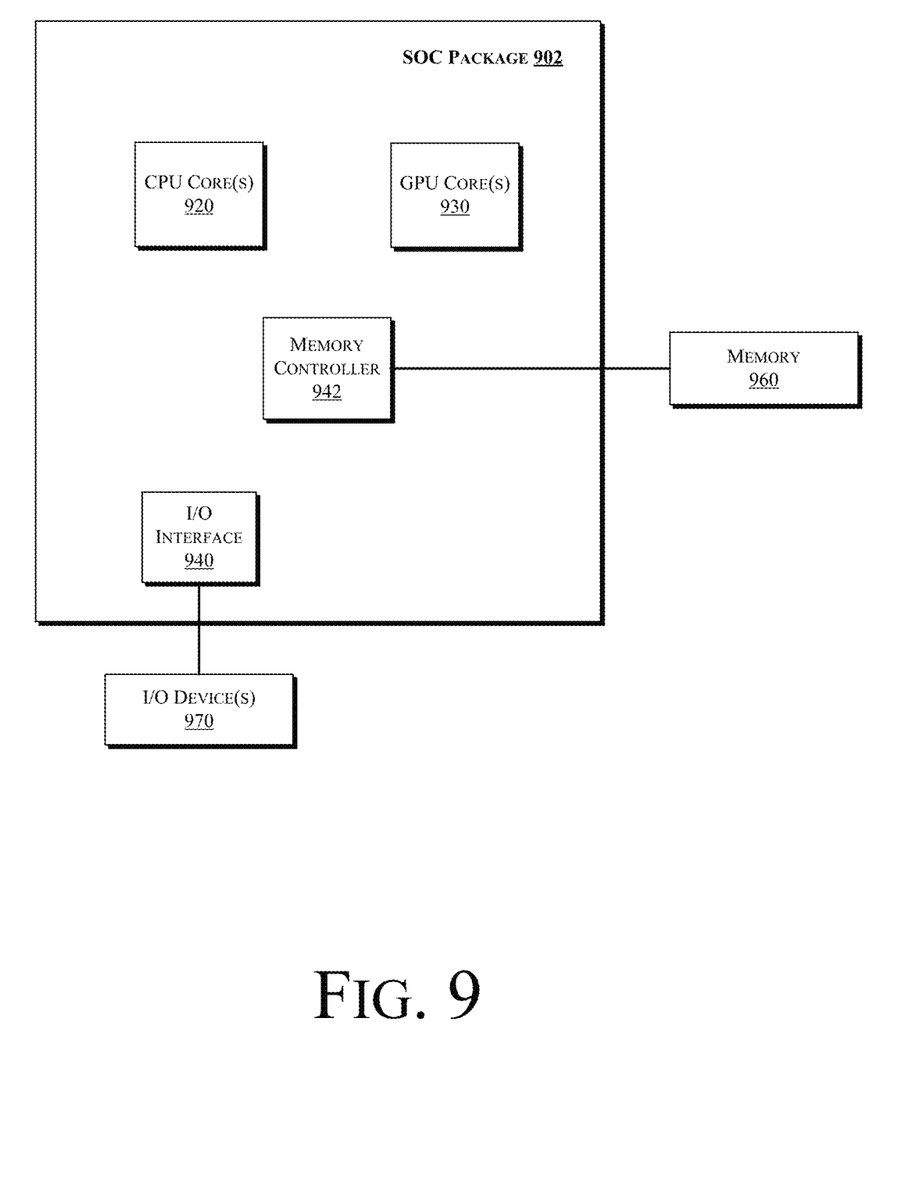

In some examples, one or more of the components discussed herein can be embodied as a System On Chip (SOC) device. FIG. 9 illustrates a block diagram of an SOC package in accordance with an example. As illustrated in FIG. 9, SOC 902 includes one or more processor cores 920, one or more graphics processor cores 930, an Input/Output (I/O) interface 940, and a memory controller 942. Various components of the SOC package 902 may be coupled to an interconnect or bus such as discussed herein with reference to the other figures. Also, the SOC package 902 may include more or less components, such as those discussed herein with reference to the other figures. Further, each component of the SOC package 902 may include one or more other components, e.g., as discussed with reference to the other figures herein. In one example, SOC package 902 (and its components) is provided on one or more Integrated Circuit (IC) die, e.g., which are packaged into a single semiconductor device.

As illustrated in FIG. 9, SOC package 902 is coupled to a memory 960 (which may be similar to or the same as memory discussed herein with reference to the other figures) via the memory controller 942. In an example, the memory 960 (or a portion of it) can be integrated on the SOC package 902.

The I/O interface 940 may be coupled to one or more I/O devices 970, e.g., via an interconnect and/or bus such as discussed herein with reference to other figures. I/O device (s) 970 may include one or more of a keyboard, a mouse, a touchpad, a display, an image/video capture device (such as a camera or camcorder/video recorder), a touch surface, a speaker, or the like.

Figure 10:
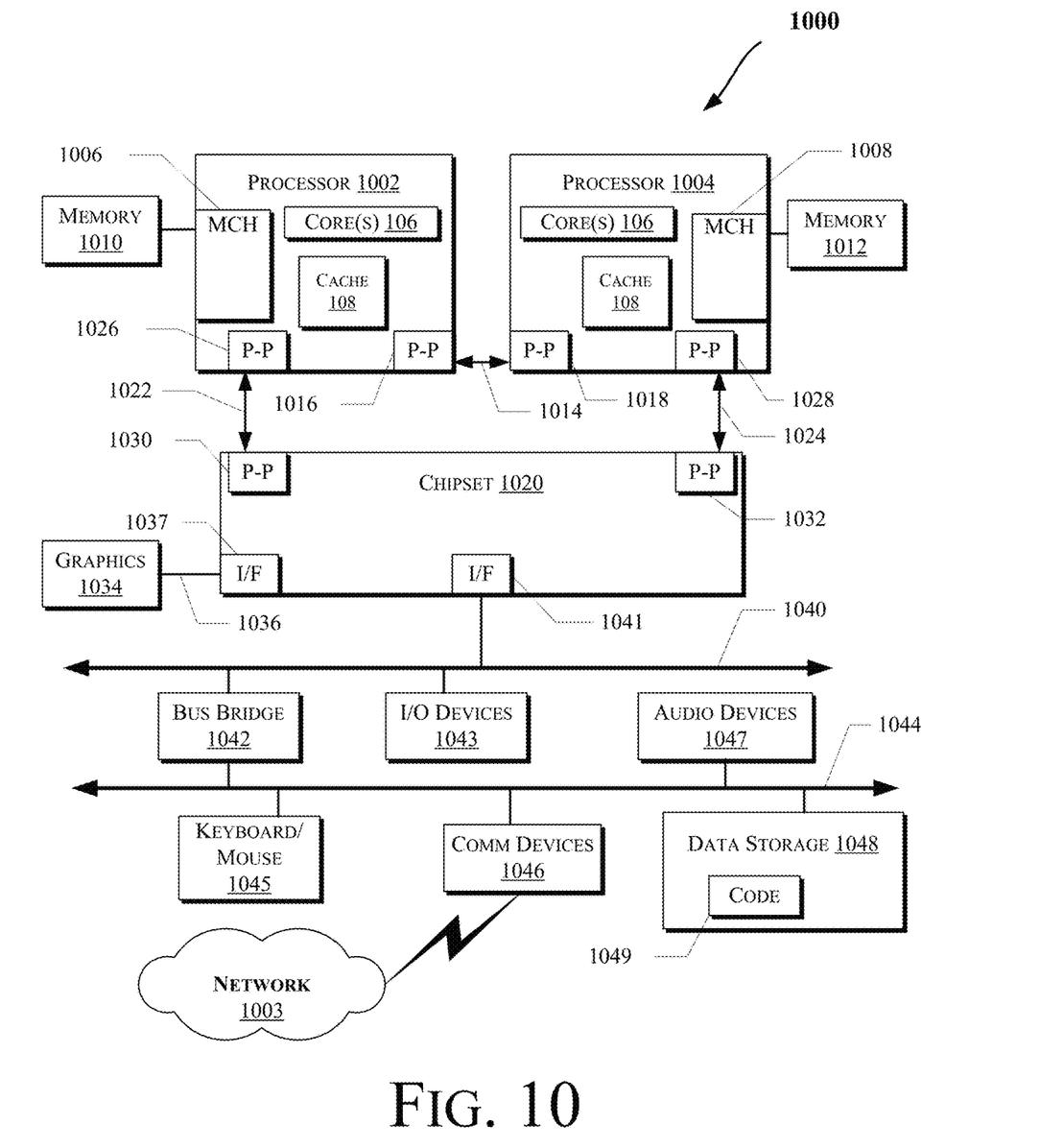

FIG. 10 illustrates a computing system 1000 that is arranged in a point-to-point (PtP) configuration, according to an example. In particular, FIG. 10 shows a system where processors, memory, and input/output devices are interconnected by a number of point-to-point interfaces. As illustrated in FIG. 10, the system 1000 may include several processors, of which only two, processors 1002 and 1004 are shown for clarity. The processors 1002 and 1004 may each include a local memory controller hub (MCH) 1006 and 1008 to enable communication with memories 1010 and 1012.

In an example, the processors 1002 and 1004 may be one of the processors 702 discussed with reference to FIG. 7. The processors 1002 and 1004 may exchange data via a point-to-point (PtP) interface 1014 using PtP interface circuits 1016 and 1018, respectively. Also, the processors 1002 and 1004 may each exchange data with a chipset 1020 via individual PtP interfaces 1022 and 1024 using point-to-point interface circuits 1026, 1028, 1030, and 1032. The chipset 1020 may further exchange data with a high-performance graphics circuit 1034 via a high-performance graphics interface 1036, e.g., using a PtP interface circuit 1037.

The chipset 1020 may communicate with a bus 1040 using a PtP interface circuit 1041. The bus 1040 may have one or more devices that communicate with it, such as a bus bridge 1042 and I/O devices 1043. Via a bus 1044, the bus bridge 1043 may communicate with other devices such as a keyboard/mouse 1045, communication devices 1046 (such as modems, network interface devices, or other communication devices that may communicate with the computer network 1003), audio I/O device, and/or a data storage device 1048. The data storage device 1048 (which may be a hard disk drive or a NAND flash based solid state drive) may store code 1049 that may be executed by the processors 1004.

The following examples pertain to further examples.

Example 1 is a traffic management system comprising a controller comprising processing circuitry to collect traffic information in a geographic region; and generate traffic statistics for the region using the traffic information; and a communication interface to forward the traffic statistics to an optical transmitter assembly.

In Example 2, the subject matter of Example 1 can optionally include a data interface to receive the traffic statistics; and an encoder to encode the traffic statics into optical signals.

In Example 3, the subject matter of any one of Examples 1-2 can optionally include an arrangement in which the optical transmitter assembly is embedded in a roadway.

In Example 4, the subject matter of any one of Examples 1-3 can optionally include an arrangement in which the optical transmitter assembly is positioned above a roadway.

In Example 5, the subject matter of any one of Examples 1-4 can optionally include processing circuitry to generate vehicle specific information for a vehicle; locate the vehicle and determine one or more optical transmitter assemblies in a travel path of the vehicle; wherein the communication interface is to forward the vehicle specific information to the one or more optical transmitter assemblies in the travel path of the vehicle.

In Example 6, the subject matter of any one of Examples 1-5 can optionally include an arrangement wherein the one or more optical transmitter assemblies comprises a data interface to receive the vehicle specific information; and an encoder to encode the vehicle specific information into optical signals.

In Example 7, the subject matter of any one of Examples 1-6 can optionally include processing circuitry to determine whether the vehicle has changed course; and in response to a determination that the vehicle has changed course, to locate the vehicle and determine one or more optical transmitter assemblies in a travel path of the vehicle, wherein the communication interface is to forward the vehicle specific information to the one or more optical transmitter assemblies in the travel path of the vehicle.

In Example 8, the subject matter of any one of Examples 1-7 can optionally include an arrangement wherein the optical signal is transmitted at a wavelength between 1 nanometer (nm) and 1 millimeter (mm).

Example 9, is a traffic management system comprising a controller comprising processing circuitry to generate vehicle specific information for a vehicle; locate the first vehicle and determine an optical transmitter assembly in a travel path of the first vehicle; and a communication interface to forward the vehicle specific information to the optical transmitter assembly in the travel path of the vehicle.

In Example 10, the subject matter of Examples 9 can optionally include an arrangement wherein the optical transmitter assembly comprises a data interface to receive the vehicle specific information; and an encoder to encode the vehicle specific information into optical signals.

In Example 11, the subject matter of any one of Examples 9-10 can optionally include an arrangement wherein the optical transmitter assembly is embedded in a roadway.

In Example 12, the subject matter of any one of Examples 9-11 can optionally include an arrangement wherein the optical transmitter assembly is positioned above a roadway In Example 13, the subject matter of any one of Examples 9-12 can optionally include processing circuitry to determine whether the vehicle has changed course; and in response to a determination that the vehicle has changed course, to locate the vehicle and determine an optical transmitter assembly in the travel path of the vehicle, wherein the communication interface is to forward the vehicle specific information to the optical transmitter assembly in the travel path of the vehicle.

In Example 14, the subject matter of any one of Examples 1-13 can optionally include an arrangement wherein the optical signal is transmitted at a wavelength between 1 nanometer (nm) and 1 millimeter (mm).

In Example 15, is a vehicle control system, comprising an optical modulator to receive and decode optical signals comprising at least one of traffic statistics or vehicle specific control information; and a controller comprising processing circuitry to: receive the at least one of traffic statistics or vehicle specific control information; and implement driving instructions based on the at least one of traffic statistics or vehicle specific control information.

In Example 16, the subject matter of Example 15 can optionally include processing circuitry to update driving instructions at least one of traffic statistics or vehicle specific control information.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and examples are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and examples are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and examples are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular examples, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one example" or "some examples" means that a particular feature, structure, or characteristic described in connection with the example is included in at least an implementation. The appearances of the phrase "in one example" in various places in the specification may or may not be all referring to the same example.

Although examples have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A traffic management system, comprising:
  a controller comprising processing circuitry to:
    collect traffic information in a geographic region;
    generate traffic statistics for the region using the traffic information;
    generate vehicle-specific information for a specific targeted vehicle; and
    locate the specific targeted vehicle and determine one or more optical transmitter assemblies in a travel path of the specific targeted vehicle; and
  a communication interface to forward the traffic statistics and the vehicle-specific information to the one or more optical transmitter assemblies in the travel path of the specific targeted vehicle for communication to the specific targeted vehicle.

2. The traffic management system of claim 1, wherein the one or more optical transmitter assemblies are embedded in a roadway.

3. The traffic management system of claim 1, wherein the one or more optical transmitter assemblies are positioned above a roadway.

4. The traffic management system of claim 1, wherein the one or more optical transmitter assemblies comprises:
  a data interface to receive the traffic statistics and the vehicle-specific information; and
  an encoder to encode the traffic statistics and the vehicle-specific information into optical signals.

5. The traffic management system of claim 1, comprising processing circuitry to:
  determine whether the specific targeted vehicle has changed course; and
  in response to a determination that the specific targeted vehicle has changed course, to locate the specific targeted vehicle and determine one or more optical transmitter assemblies in a changed travel path of the specific targeted vehicle,
  wherein the communication interface is configured to forward the vehicle-specific information to the one or more optical transmitter assemblies in the changed travel path of the specific targeted vehicle.

6. The traffic management system of claim 1, wherein an optical signal is transmitted by the one or more optical transmitter assemblies at a wavelength between 1 nanometer (nm) and 1 millimeter (mm).

7. A traffic management system, comprising:
  a controller comprising processing circuitry to:
    generate vehicle-specific information for a specific targeted vehicle; and
    locate the specific targeted vehicle and determine an optical transmitter assembly in a travel path of the specific targeted vehicle; and
  a communication interface to forward the vehicle-specific information to the optical transmitter assembly in the travel path of the specific targeted vehicle for communication to the specific targeted vehicle.

8. The traffic management system of claim 7, wherein the optical transmitter assembly comprises:
  a data interface to receive the vehicle-specific information; and
  an encoder to encode the vehicle-specific information into optical signals.

9. The traffic management system of claim 8, wherein the optical transmitter assembly is embedded in a roadway.

10. The traffic management system of claim 8, wherein the optical transmitter assembly is positioned above a roadway.

11. The traffic management system of claim 7, comprising processing circuitry to:
    determine whether the specific targeted vehicle has changed course; and
    in response to a determination that the specific targeted vehicle has changed course, to locate the specific targeted vehicle and determine an optical transmitter assembly in a changed travel path of the specific targeted vehicle,
    wherein the communication interface is to forward the vehicle-specific information to the optical transmitter assembly in the changed travel path of the specific targeted vehicle.

12. The traffic management system of claim 7, wherein the optical signal is transmitted by the optical transmitter assembly at a wavelength between 1 nanometer (nm) and 1 millimeter (mm).

13. A specific targeted vehicle control system, comprising:
    an optical modulator to receive and decode optical signals comprising vehicle-specific control information received from one or more optical transmitter assemblies in a travel path of a specific targeted vehicle; and
    a controller coupled to the optical modulator and comprising processing circuitry to:
      receive the vehicle-specific control information; and
      implement driving instructions based on the vehicle-specific control information.

14. The specific targeted vehicle control system of claim 13, comprising processing circuitry to:
    update the driving instructions based on the vehicle-specific control information.

15. The traffic management system of claim 1, wherein the specific targeted vehicle is an autonomous vehicle, and the vehicle-specific information is vehicle-specific control information for implementing driving instructions by the targeted autonomous vehicle.

16. The traffic management system of claim 1, wherein the processing circuitry is further to:
    calculate an estimated time of arrival (ETA) of the specific targeted vehicle at a next optical transmitter assembly in the path of the specific targeted vehicle.

17. The traffic management system of claim 16, wherein the next optical transmitter assembly is configured to wait for a period of time corresponding approximately to the ETA of the specific targeted vehicle at the next optical transmitter assembly in the path of the specific targeted vehicle before transmitting the vehicle-specific information to the specific targeted vehicle.

18. The traffic management system of claim 16, wherein the next optical transmitter assembly is configured to repeatedly transmit the vehicle-specific information for a time window surrounding the ETA.

19. The traffic management system of claim 7, wherein the specific targeted vehicle is an autonomous vehicle, and the vehicle-specific information is vehicle-specific control information for implementing driving instructions by the targeted autonomous vehicle.

20. The traffic management system of claim 7, wherein the processing circuitry is further to:
    calculate an estimated time of arrival (ETA) of the specific targeted vehicle at a next optical transmitter assembly in the path of the specific targeted vehicle.

21. The traffic management system of claim 20, wherein the next optical transmitter assembly is configured to wait for a period of time corresponding approximately to the ETA of the specific targeted vehicle at the next optical transmitter assembly in the path of the specific targeted vehicle before transmitting the vehicle-specific information to the specific targeted vehicle.

22. The traffic management system of claim 20, wherein the next optical transmitter assembly is configured to repeatedly transmit the vehicle-specific information for a time window surrounding the ETA.

23. The specific targeted vehicle control system of claim 13, wherein the specific targeted vehicle is an autonomous vehicle.

* * * * *